July 1, 1952  H. A. HANSON  2,601,802
SELF-LOCKING COUPLING PIN
Filed May 25, 1950
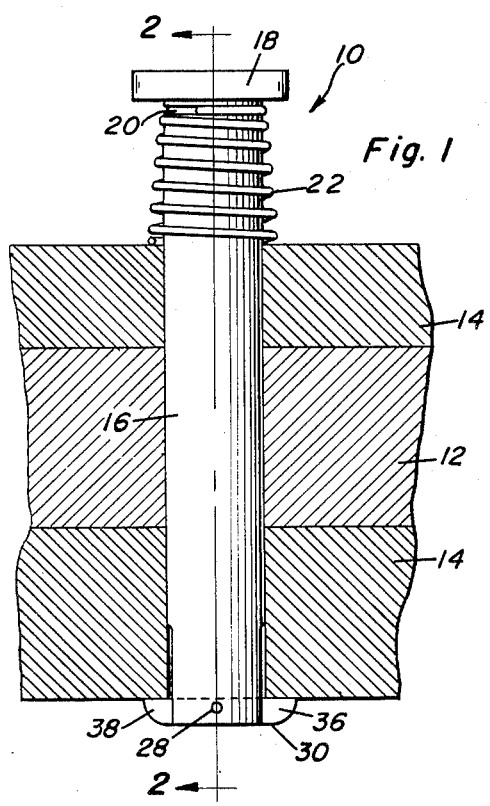
Fig. 1
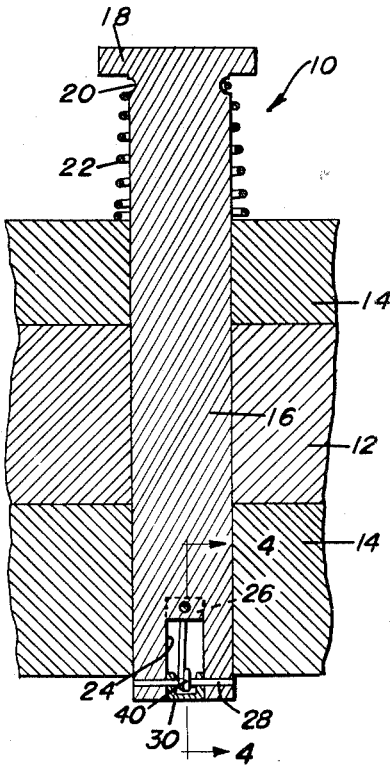
Fig. 2
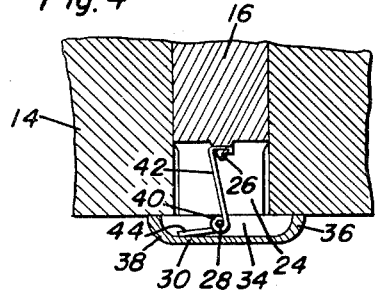
Fig. 4
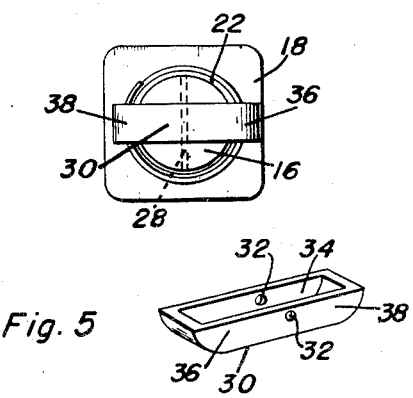
Fig. 3
Fig. 5
Howard A. Hanson
INVENTOR.
BY *Clarence A. O'Brien*
*and Harvey B. Jacobson*
Attorneys Patented July 1, 1952

2,601,802

UNITED STATES PATENT OFFICE 2,601,802

SELF-LOCKING COUPLING PIN

Howard A. Hanson, Eureka, Mont., assignor of fifty per cent to David Hanson, Eureka, Mont.

Application May 25, 1950, Serial No. 164,125

1 Claim. (Cl. 85—3)

This invention comprises novel and useful improvements in a self-locking coupling pin and more specifically pertains to an improved coupling pin for detachably securing in coupled relation rods or plates to clevises, forks, drawbars and similar members.

The primary object of this invention is to provide an improved coupling pin by means of which various elements may be releasably connected together in a manner which is extremely secure; and wherein the coupling and uncoupling operation of the pin may be performed in an automatic manner.

An important object of the invention is to provide an improved coupling pin wherein a latching element is pivotally secured thereto and which is housed within the confines of the pin during insertion through the members with which the pin is associated.

A still further object of the invention is to provide an improved self-locking coupling pin which shall be provided with a locking or latching element which is automatically biased into an inoperative position, together with means for retaining the latching member in its latched position during operation of the coupling pin.

A still further object of the invention is to provide an improved coupling pin which shall be capable of operation by one hand of the user for application of the pin to the members to be coupled and for withdrawal of the pin therefrom.

And a final important object of the invention to be specifically enumerated herein resides in the provision of an automatic, self-locking coupling pin which is provided with a latch member which is yieldingly biased in one direction, and is so constructed as to automatically be moved to latching position upon initial application of the coupling pin to the members to be fastened together, and upon further movement of the coupling pin will enable the latching member to be released.

These, together with various ancillary features and objects of the invention, which will later become apparent as the following description proceeds, are attained by the present invention, a preferred embodiment of which has been illustrated by way of example, in the accompanying drawings, wherein:

Figure 1 is a sectional view showing the improved coupling pin incorporating therein the principles of this invention applied to the members to be coupled together, the members being shown in section and the pin in elevation;

Figure 2 is a vertical transverse sectional view taken substantially upon the plane indicated by the section line 2—2 of Figure 1 and showing the interior construction of the latch construction of the pin;

Figure 3 is a bottom plan view of the locking pin shown in Figure 1;

Figure 4 is a vertical longitudinal sectional view taken substantially upon the plane indicated by the section line 4—4 of Figure 2 and showing further structural details of the latching member and its resilient biasing means; and Figure 5 is a perspective view of the latching member removed from the coupling pin.

Referring now more specifically to the accompanying drawings, wherein like numerals designate similar parts throughout the various views, it will be seen that the novel coupling pin forming the subject matter of this invention is indicated generally by the numeral 10, and is shown in Figures 1 and 2 as being in operative position for coupling one member 12 between a pair of members 14 which may constitute the arms of a clevis, fork or the like.

As will be readily understood, the pin is adapted to be inserted into or removed from aligned apertures of the members to be coupled together.

The coupling pin 10 comprises a shank portion 16 which may be of circular cross section if desired, although the invention is not limited to any particular cross sectional configuration, the same having a head portion 18 by means of which the pin may be manipulated and may be retained in coupled position as set forth hereinafter.

Adjacent the upper end of the shank 16, that is in juxtaposition to the head portion 18, an annular groove 20 is provided which constitutes a seat to receive the end convolution of a compression spring 22 which surrounds the upper portion of the shank. This compression spring is adapted to abut against the coupling pin head 18 and the adjacent surface of one of the members 14, to yieldingly urge the pin outwardly from its engagement in the registering apertures of the members 12 and 14.

At any convenient point along its length, the shank 16 is provided with a diametrically or transversely extending slot 24, and in the instance illustrated this slot opens at the bottom end of the pin. Extending into this slot from the shank 16 is a centrally or axially disposed rib or lug 26 for a purpose which will be later apparent. Pivotally mounted in the lower portion of the slot 24 as by a pivot pin 28, is a latch member 30, see Figure 5, whose sides are provided with apertures 32 for the reception of the pivot pin 28. Preferably, the pivot pin and the apertures are disposed eccentrically with respect to the midportion of the latch 30, so as to provide a portion 36 on one side of the pivot pin which is relatively longer than the portion 38 at the other side thereof. This relation of the parts is more clearly brought out in the view of Figure 3.

A resilient means is provided, the same preferably consisting of a helical spring portion 40 which is wound about the pivot pin 28 and is housed within a longitudinal groove 34 in the latch 30, this spring being provided with an upper arm portion 32 having a terminal anchored in an aperture in the depending rib or lug 26 above mentioned, and having its other arm 44 engageable against the bottom of the groove 34 to yieldingly urge the latch member in one direction of rotation.

The parts are so arranged that either portion 36 or 38 of the latch member may be rotated into the slot 24 whereby the longitudinal axis of the latch member is disposed in substantially parallel relation with the longitudinal axis of the shank 16, and the latch is recessed and does not extend beyond the sides of the shank, so that when turned into this position, the coupling pin and latch can be readily inserted into or withdrawn from the registered apertures in the members 12 and 14.

The operation of the device is as follows. With the members 12 and 14 properly positioned with their bores in register, the short portion 38 is pressed into the slot, against the resistance of the spring member, so that the short portion 38 is entirely housed within the slot, while the long portion 36 extends axially therefrom. In this position, the pin is inserted in the aligned bores, and by pressing upon the head 18, against the resistance of the compression spring 22, the end of the pin is caused to protrude from the farthermost of the members 14. As soon as the end of the pin protrudes sufficiently to release the extremity of the portion 38, the latter pivots in a counterclockwise direction, and the longer portion 36 will now abut the member 14 so that the latch member is positioned in crosswise direction. It will be apparent that even though the pin is depressed far enough to permit the short portion to clear the bore in the plate 14, the long portion will strike this plate whereby the latch will be positioned transversely upon release of the head 18, the spring 22 will position the device as shown in Figures 1 and 2. To release the pin, it is merely necessary to depress the pin further into the bores against the spring 22 until the longer portion 36 clears the same, and register with the slot 24, whereupon the spring will urge the latch into the slot, and the end of the portion 36 will strike against the rib 26 which forms a stop on the same. The pressure upon the head 18 may then be released, and the spring 22 will cause withdrawal of the pin from the members to which it is coupled.

It is to be clearly understood that as so far described, and as so far illustrated, the coupling pin hereinbefore set forth is to be considered as illustrative of the principles of the invention only, and not as a limitation thereof. Thus, various shapes of shanks could be provided, various constructions of springs 22 could be employed, and different types of resilient means in place of that shown at 40, 42 and 44 could be employed.

Moreover, instead of the slot 24 being at the end of the coupling pin, the same could be in any desired position along the length of the pin, in order to adapt the invention to different environments of use.

However, it is considered to be a very important advantage of this invention that the resilient means for the latch is housed entirely within the slotted portion of the shank, and particularly importance is attached to the uneven length of the portions 36 and 38, giving the above described differential action in applying and releasing the pin by pressing the same to various depths of penetration into the members to be secured together.

From the foregoing, the construction and operation of the device will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claim.

Having described the invention, what is claimed as new is:

A self-locking coupling pin comprising an elongated shank having a head thereon, a compression spring surrounding said shank, said shank having a slot extending transversely therethrough at the end opposite said head, a latch in said slot, means mounting said latch in said slot for pivotal movement between opposed longitudinal positions wherein said latch is in alignment with said shank and within the confines of said slot and a transverse position wherein the ends of the latch extend from said slot laterally of said shank, spring means engaging said latch and shank for biasing said latch in one direction, said latch having a longitudinal groove, said spring means being engaged in said groove, said latch comprising portions of unequal length with respect to said mounting means, said shank having a lug in said slot, one end of said spring means engaging said lug, the longer portion of said latch from its pivot being engageable against said lug and being biased thereagainst by said spring means.

HOWARD A. HANSON.

REFERENCES CITED

The following references are of record in the file of this patent:

UNITED STATES PATENTS

| Number | Name | Date |
|---|---|---|
| 196,914 | Lockwood | Nov. 6, 1877 |
| 1,373,188 | Goewey | Mar. 29, 1921 |
| 1,373,959 | Sherwood | Apr. 19, 1921 |
| 1,769,170 | Ward | July 1, 1930 |
| 1,841,563 | Williams | Jan. 19, 1932 |
| 2,124,658 | Smith | July 26, 1938 |
| 2,246,834 | Bowman | June 24, 1941 |